Dec. 2, 1941.   J. E. LOWTHER   2,264,478
FLUID DRIVE
Filed March 11, 1941   4 Sheets-Sheet 1

Inventor
John E. Lowther

By Clarence A. O'Brien
Attorney

Dec. 2, 1941.    J. E. LOWTHER    2,264,478
FLUID DRIVE
Filed March 11, 1941    4 Sheets-Sheet 2

Inventor
John E. Lowther
By Clarence A. O'Brien
Attorney

Inventor
John E. Lowther
By Clarence A. O'Brien
Attorney

Dec. 2, 1941.    J. E. LOWTHER    2,264,478
FLUID DRIVE
Filed March 11, 1941    4 Sheets-Sheet 4
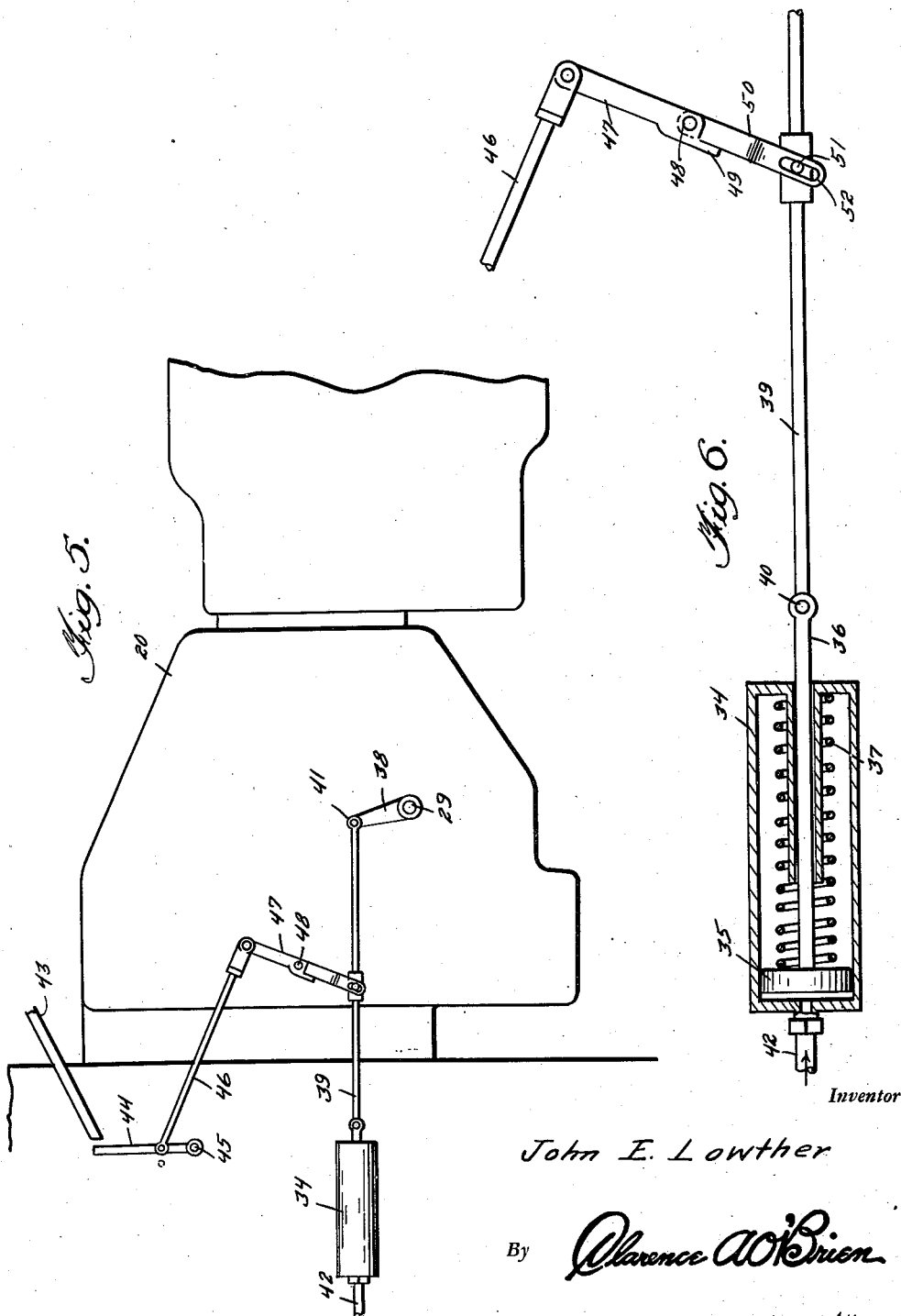
Inventor
John E. Lowther
By Clarence A. O'Brien
Attorney Patented Dec. 2, 1941

2,264,478

UNITED STATES PATENT OFFICE 2,264,478

FLUID DRIVE

John E. Lowther, Harrisville, W. Va.

Application March 11, 1941, Serial No. 382,805

2 Claims. (Cl. 192—3.2)

My invention relates to improvements in so-called fluid drives for automobiles and more particularly to auxiliary clutch mechanism therefor.

By way of explanation, in certain fluid drives, of commerce, for automobiles, characterized by a motor operated driver or impeller, and a fluid impelled runner, or driven member, when the motor is stopped the runner, or driven member of the drive is free to idle and being connected to the rear end of the automobile only through the automobile clutch and transmission, the automobile is free to coast on a grade unless the parking brake is effectively applied. Obviously, if setting of the parking brake is neglected, or, in the event that said brake fails to hold, serious damage may result by coasting of the automobile when parked on a grade, or, in the event that the motor stalls on an up-grade and the parking brake fails.

Having the foregoing in mind, it is the principal object of my invention to equip such drives with simply constructed, efficient mechanism whereby when the motor stalls, or is stopped, a direct driving connection is automatically established between the motor operated driver and the rear end so that the compression in the motor will serve to prevent coasting of the automobile.

Another object is to provide for breaking the connection as an incident to operation of the motor at a speed sufficient to render the fluid drive effective.

Other, and subordinate, objects are also comprehended by my invention, all of which, together with the precise nature of my improvements, will be readily understood when the succeeding description and claims are read with reference to the drawings accompanying and forming part of this specification.

Figure 1:
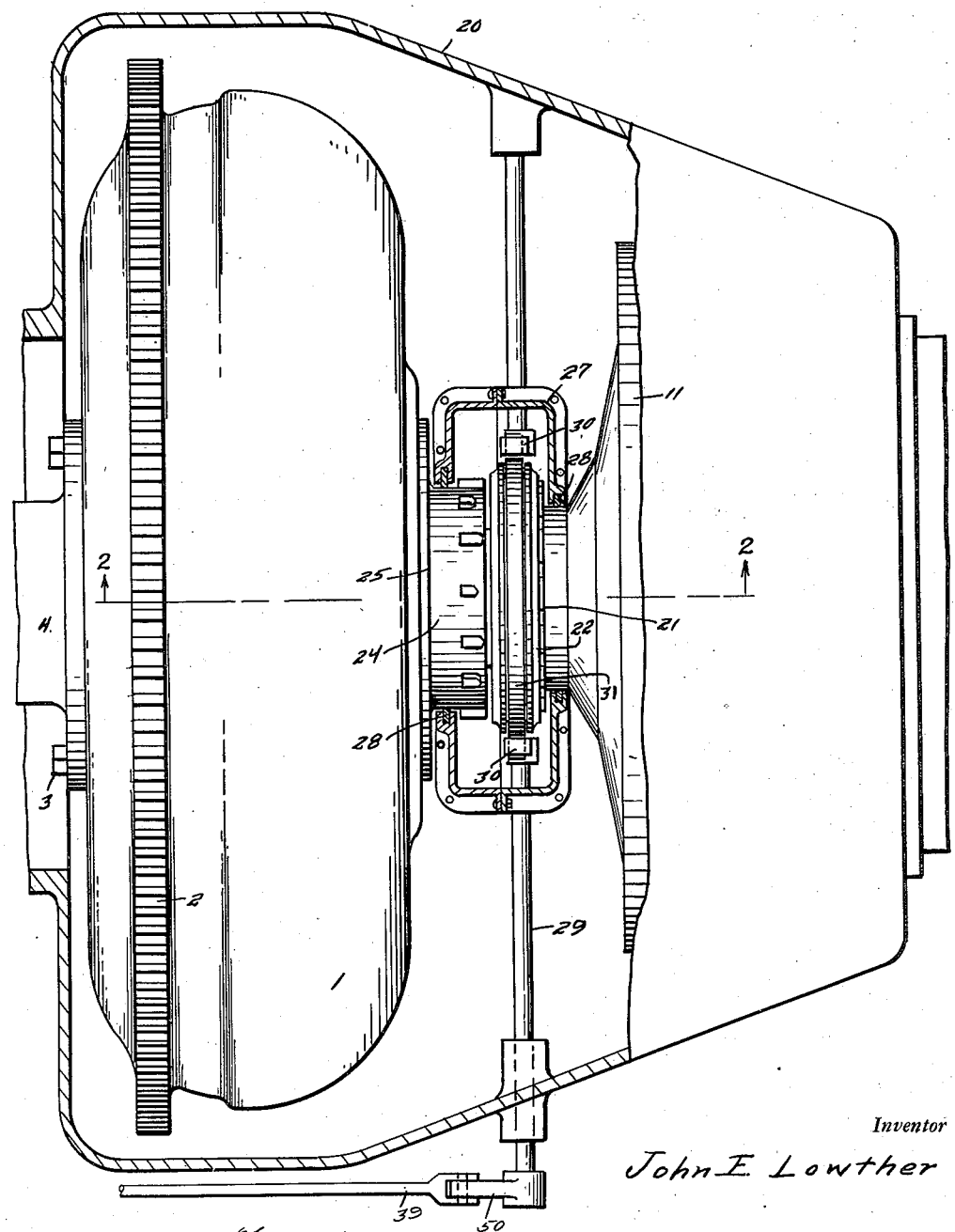
Figure 2:
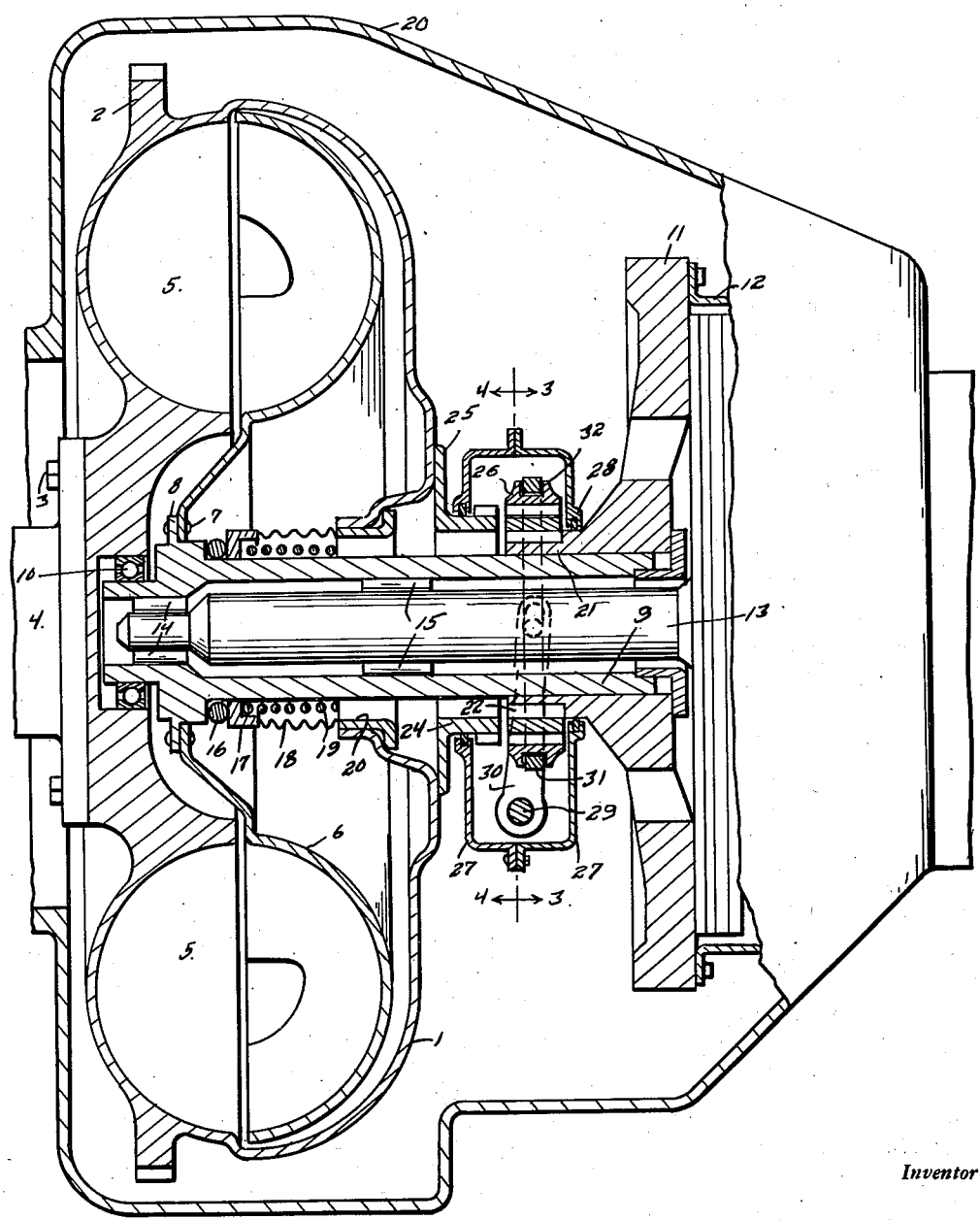
Figure 3:
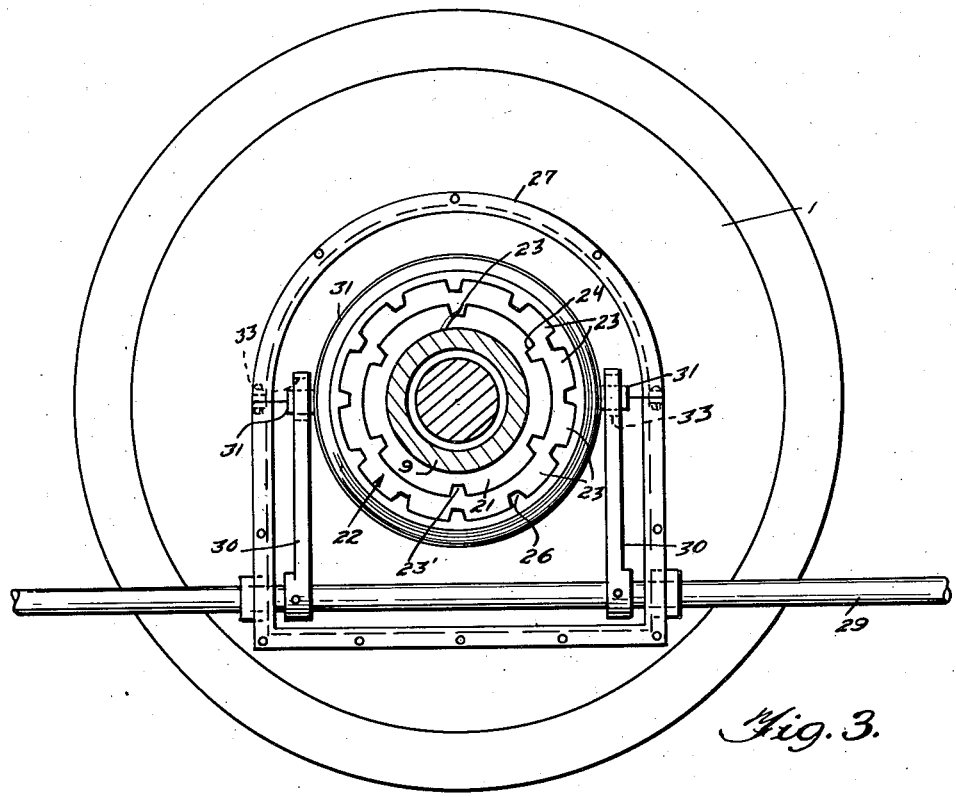
Figure 4:
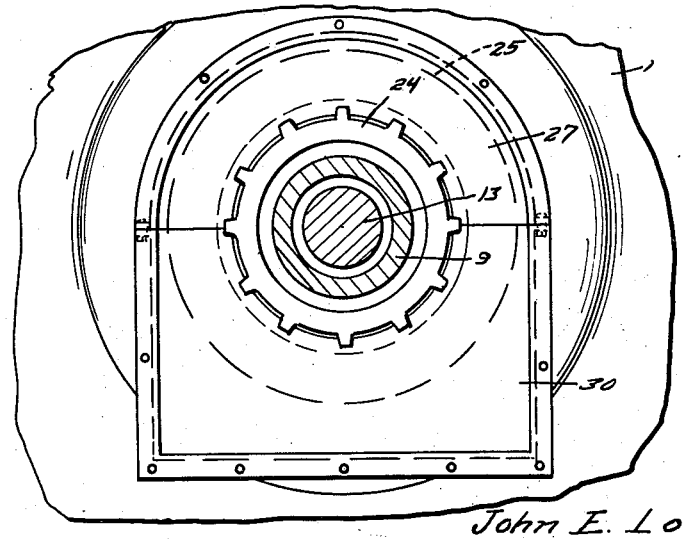

In said drawings:

Figure 1 is a fragmentary view partly in top plan and partly in transverse section of a fluid drive equipped according to my invention, Figure 2 is a view in section taken on the line 2—2 of Figure 1, Figure 3 is a detail view in transverse section taken on the line 3—3 of Figure 2 and drawn to an enlarged scale, Figure 4 is a similar view taken on the line 4—4 of Figure 2, Figure 5 is a fragmentary view in side elevation illustrating the operating means for the auxiliary clutch, and Figure 6 is a view partly in longitudinal section and partly in side elevation of said means.

Reference being had to the drawings by numerals, the type of fluid drive with which my invention is more particularly concerned embodies a hollow oil-containing driver, or impeller 1, forming a fly wheel, and equipped with the usual starter gear 2 on the same, said driver being bolted, as at 3, to the crank shaft 4 of the motor, not shown, for rotation by said shaft and having therein fins 5 for causing the oil to swirl around in the driver. The runner, or driven member, 6 is housed in the member 1 and is of the turbine rotor type fluid impelled in a manner which will be understood. The runner 6 is bolted, as at 7, to an annular flange 8 on the front end of a sleeve 9 whereby said sleeve is operative by the runner. The sleeve 9 extends axially into the driver 1 and is journalled at its front end in bearings 10, with its rear end extending out of said member 1 and having fast thereon the hub of the usual power transmitting or driving clutch plate 11 forming part of the usual clutch 12 for operating the driven shaft 13 of the transmission, not shown, said shaft being journalled in the sleeve 9 by roller bearings 14, 15. The parts 16, 17, 18, 19 and 20 are elements of an oil seal assembly through which the sleeve 9 extends in the member 1 and which being well understood in the art need merely be identified in passing. The parts of the described drive are enclosed in the usual housing 20 forming part of the crank case of the motor.

According to my invention, an auxiliary mechanical clutch is provided between the clutch plate 11 and the driver, or impeller, 1 as follows.

Fast on the hub 21 of said plate 11 is a flat, annular, clutch member 22 having internal, transverse keys 23' fitting into similar grooves 24' formed in said hub 21, said member having transverse peripheral teeth 23 therein.

Opposed to the annular clutch member 22 is an externally toothed, annular clutch member 24 freely rotatable around the sleeve 9 and having a radial edge flange 25 suitably secured, as by welding, not shown, to the driver, or impeller, 1 concentrically of the same and of said clutch member 22. The clutch member 24 is of the same diameter as clutch member 22 and opposed edgewise to the latter closely contiguous to the same.

An annular, internally toothed coupler 26 encircling the clutch member 22 is slidably interfitted therewith for shifting thereon over the clutch member 24 into mesh with the teeth of the latter to thereby couple the clutch member 22 to the clutch member 24.

A suitable oil-containing housing 27 is mounted on the clutch member 24 and hub 21 in surrounding relation thereto and by bearing rings 28 in which said member and hub are adapted to rotate.

Extending through the housing 27 below the coupler 26 and having its ends suitably journalled in the sides of the housing 27, is a shifter rock shaft 29 provided with a pair of shifter arms 30 fast thereon and upstanding therefrom upon opposite sides of the coupler 26 within the housing 27. The shifter arms 30 are operatively connected to the coupler 26 by means of a ring 31 fitted in a peripheral groove 32 in said coupler, slots 33 in said arms 30, and a pair of diametrically opposite studs 34 on said ring extending into said slots.

As will be manifest, rocking of the shifter shaft 29, and hence the shifter arms 30, in opposite directions will shift the coupler 26 into and from coupling position relative to the clutch members 22, 24.

At a suitable point, preferably on the crank case of the motor, a hydraulic cylinder 34 is provided having a piston 35 operative under hydraulic pressure to project a piston rod 36 from the cylinder in opposition to a suitably arranged spring 37 in the cylinder normally retracting the piston and rod. The piston rod 36 is operatively connected to the rock shaft 29 by means of a crank arm 38 on one end of said shaft and a link 39 having its opposite ends pivotally connected to said rod and crank as at 40, 41, respectively, the connection being so arranged that in the retracted position of the piston 35 and rod 36, said shaft 29 is held in normal position in which the coupler 26 is held in coupling position on the clutch members 22, 24.

The cylinder 34 is provided with a suitable fluid inlet line 42 adapted to be tapped into the oil pressure line, not shown, of the motor, not shown, so that as soon as pressure is caused in said line by operation of the motor such pressure is introduced into the cylinder 34 so as to drive the piston 35 in a direction to project the rod 36 and thereby, through the described connections 38, 39, rock shaft 29 in the proper direction to shift the coupler 26 from coupling position.

As will now be manifest from the foregoing, when the motor is stopped, or has stalled, the coupler 26 is shifted into coupling position to thereby connect the driver 1 to the runner 6 so that in effect, the rear end, or differential, not shown, is locked to the motor crank shaft 4 and the automobile will be held against coasting by the compression in the motor.

As will also be manifest, in order to start the motor without driving the automobile through the starter, it is essential that the coupler 26 be shifted to uncoupling position relative to the clutch member 24. To this end, means are provided for manually operating the link 39 in the proper direction to rock the shaft 29 from normal position in opposition to the spring 37, so as to shift the coupler to uncoupling position.

The manual operating means comprises a plunger rod 43 suitably secured to the starter pedal, not shown, and adapted for operation under depression of said pedal to swing a lever 44 pivoted, as at 45, on the crank case of the motor. A draw link 46 operatively connects said lever 44 to a second lever 47 pivoted, as at 48, to the housing 20, said pivot 48 together with a lug 49 on the lever 47 forming a rule joint connection between the lever 47 and a lever 50 swingable on the pivot 48 and operatively connected to the link 39 by a compensating slot and pin connection 51, 52, serving a purpose which will be clear. The joint connection 48, 49, provides for movement of the link 39 under projection of the piston rod 39 independently of the operation of the described manual operating means.

The foregoing will, it is believed, suffice to impart a clear understanding of my invention, since the operation and advantages thereof have been set forth in full in connection with the description of parts.

Manifestly the invention, as described, is susceptible of modification without departing from the inventive concept, and right is herein reserved to such modifications as fall within the scope of the subjoined claims.

What I claim is:

1. In a fluid drive including a motor operative driver, a power transmitting clutch, and a fluid impelled runner operatively connected to said clutch, an auxiliary clutch between said power transmitting clutch and driver normally engaged, means operative by fluid pressure to disengage said auxiliary clutch and adapted to be rendered effective by operation of the motor, and manually operative means for operating said first mentioned means independently of fluid pressure.

2. In a fluid type motor drive for automobiles having an oil pressure line and a starter pedal, a motor operative driver, a power transmitting clutch, a fluid impelled runner operatively connected to said clutch, an auxiliary clutch between said power transmitting clutch and driver, normally engaged, means to disengage said auxiliary clutch operative by fluid pressure and adapted for connection to said oil pressure line to be rendered effective by pressure in said line, and means to operate said first mentioned means independently of fluid pressure and adapted to be operated by said starter pedal.

JOHN E. LOWTHER.